(12) United States Patent
Whitsett et al.

(10) Patent No.: US 8,756,306 B1
(45) Date of Patent: Jun. 17, 2014

(54) DASHBOARD INTERFACE GROUP IDENTIFIER

(75) Inventors: Duane B. Whitsett, Tulsa, OK (US); Chris L. White, Plano, TX (US); Evan Pedersen, Colorado Springs, CO (US); Edmund G. Dombrowski, Hamilton, VA (US); Eric S. Derose, Fairfax, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 609 days.

(21) Appl. No.: 11/771,545

(22) Filed: Jun. 29, 2007

(51) Int. Cl.
*G06F 15/173* (2006.01)

(52) U.S. Cl.
USPC .............................. 709/224; 705/64; 705/21

(58) Field of Classification Search
USPC ........................................................ 709/224
See application file for complete search history.

(56) References Cited

U.S. PATENT DOCUMENTS

| | | | |
|---|---|---|---|
| 2004/0211830 A1* | 10/2004 | Algiene | 235/379 |
| 2005/0049969 A1* | 3/2005 | Kane | 705/45 |
| 2005/0216421 A1* | 9/2005 | Barry et al. | 705/64 |
| 2006/0043169 A1* | 3/2006 | Haertel | 235/379 |
| 2006/0212358 A1* | 9/2006 | Walker et al. | 705/21 |
| 2006/0293956 A1* | 12/2006 | Walker et al. | 705/14 |
| 2007/0043945 A1* | 2/2007 | Choi et al. | 713/168 |
| 2007/0214152 A1* | 9/2007 | Goodman et al. | 707/10 |
| 2007/0255757 A1* | 11/2007 | Tsukerman et al. | 707/104.1 |
| 2008/0027795 A1* | 1/2008 | Medlin et al. | 705/14 |
| 2008/0120179 A1* | 5/2008 | Wheeler et al. | 705/14 |
| 2008/0120204 A1* | 5/2008 | Conner et al. | 705/28 |
| 2008/0184116 A1* | 7/2008 | Error | 715/704 |
| 2008/0192908 A1* | 8/2008 | O'Keefe et al. | 379/93.17 |
| 2008/0249658 A1* | 10/2008 | Walker et al. | 700/236 |
| 2008/0270398 A1* | 10/2008 | Landau et al. | 707/6 |
| 2008/0313065 A1* | 12/2008 | Eder | 705/35 |
| 2009/0012900 A1* | 1/2009 | Morin et al. | 705/64 |
| 2009/0018891 A1* | 1/2009 | Eder | 705/10 |

\* cited by examiner

*Primary Examiner* — Hamza Algibhah

(57) ABSTRACT

A device receives multiple identifiers associated with a customer of a network, receives multiple products associated with the customer and provided by the network, groups the multiple identifiers into a single customer identifier, and associates the single customer identifier with the multiple products.

23 Claims, 10 Drawing Sheets

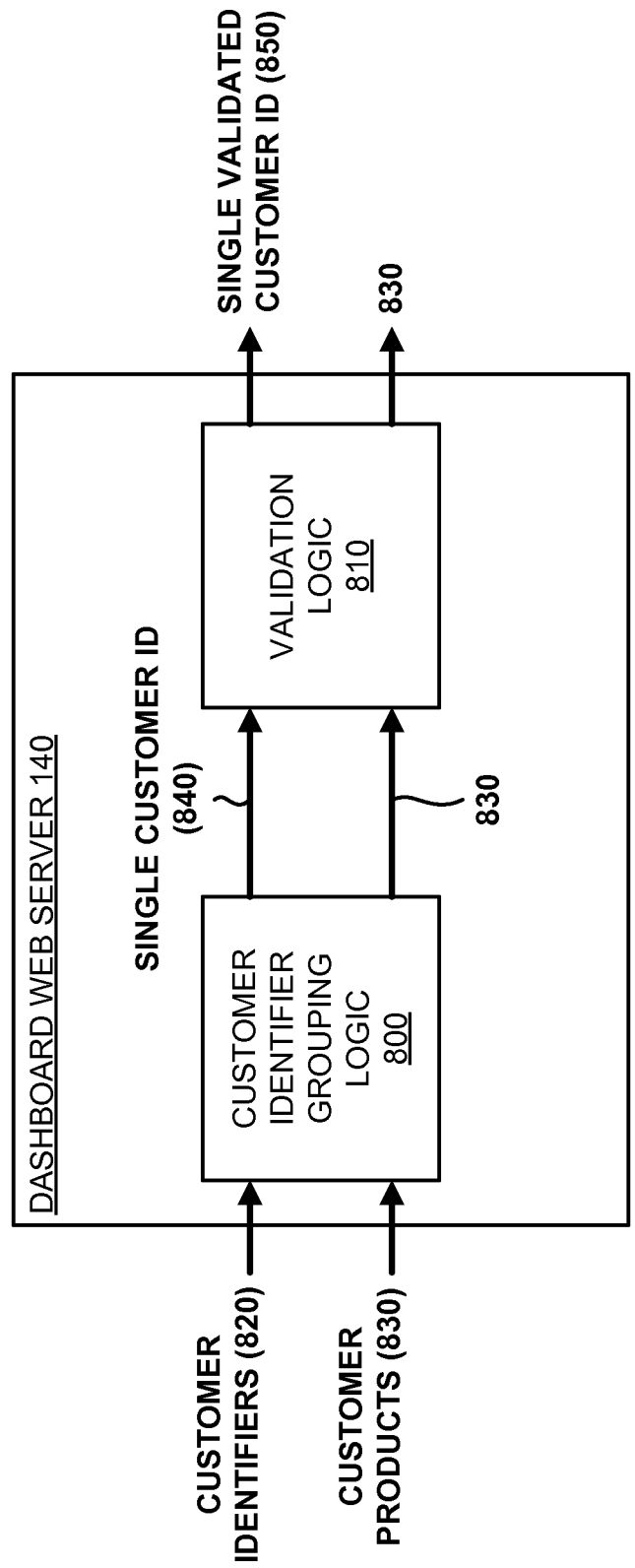

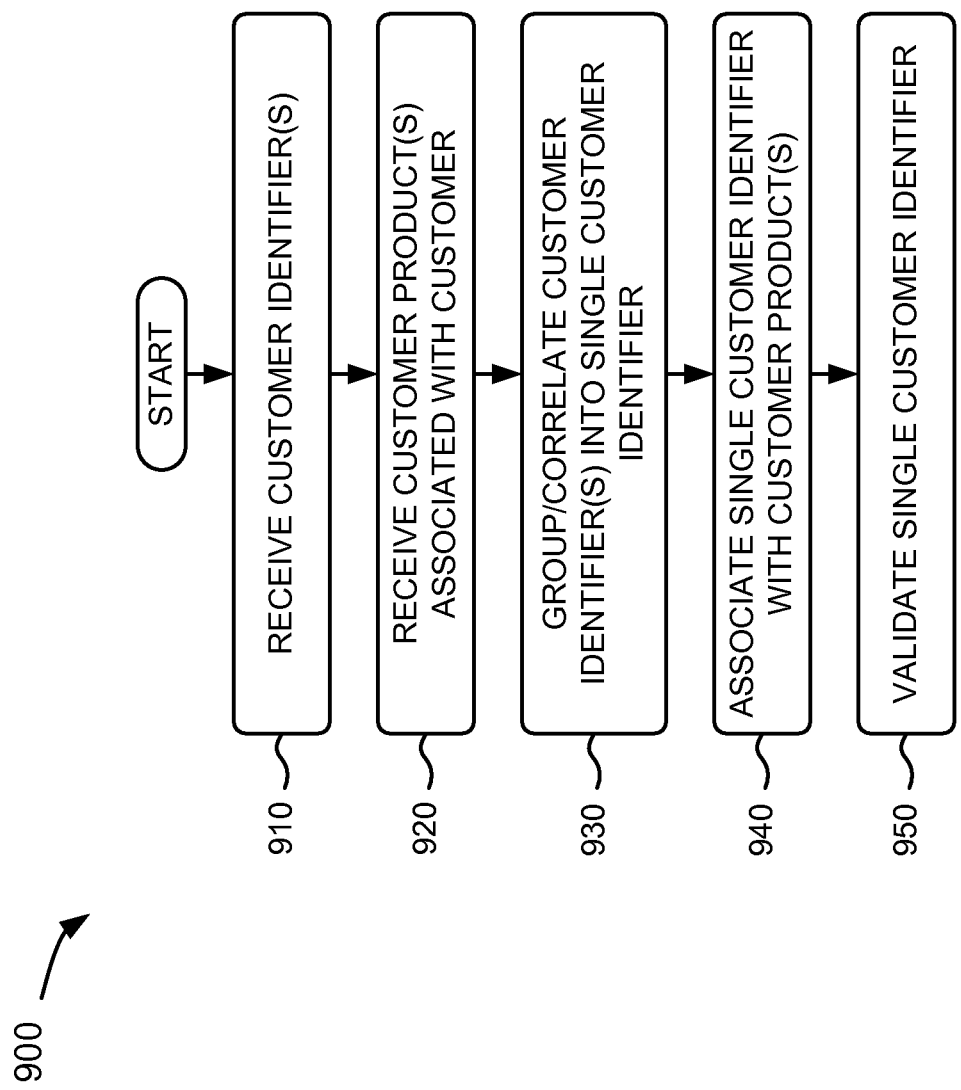

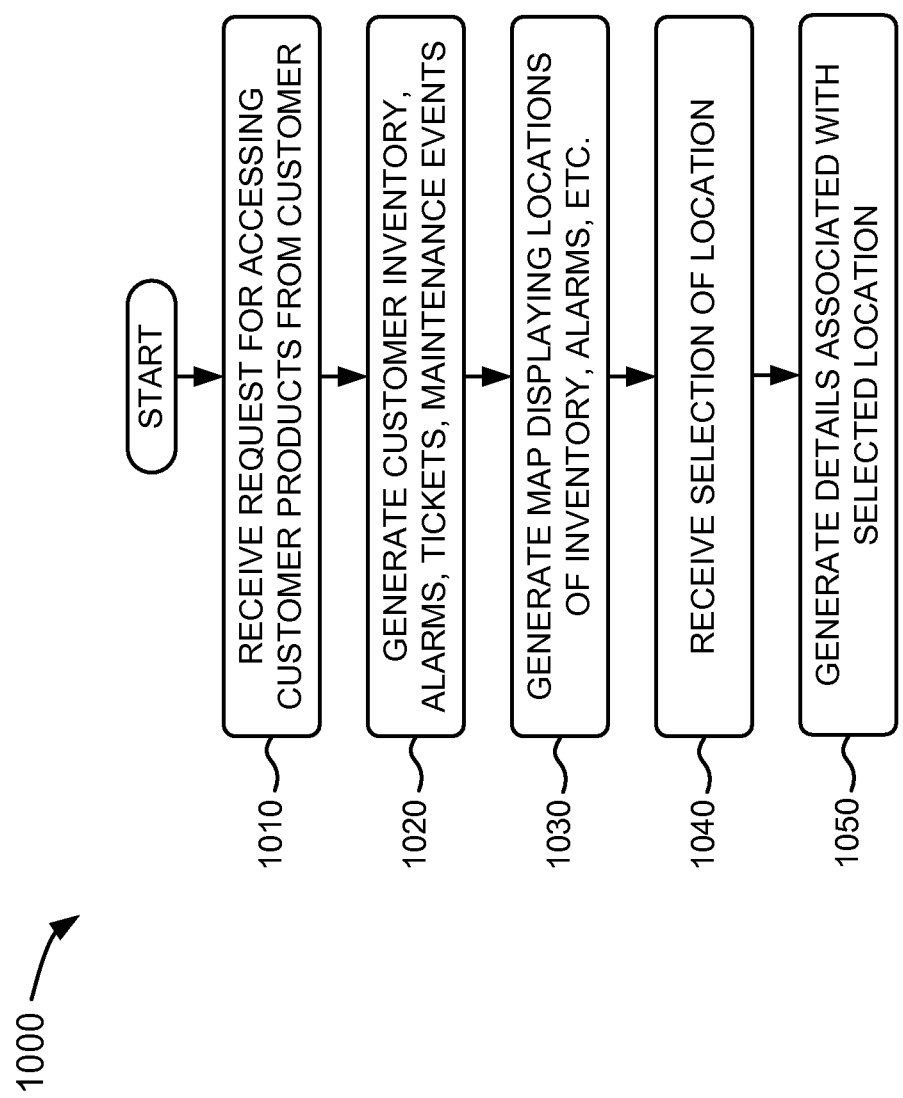

DASHBOARD INTERFACE GROUP IDENTIFIER

BACKGROUND

Large customers of network services may subscribe to different networks that include various types of inventory (e.g., circuits, devices, etc.). For example, a customer may subscribe to a private Internet Protocol (IP) network that provides private (e.g., secure) network services to the customer. The private IP network may include an inventory (e.g., circuits, devices, etc.) that may be provided throughout various locations (e.g., throughout various states, regions, countries, etc.). Portions of the inventory may require maintenance (e.g., a circuit may generate an alarm indicating a problem), and tickets may be generated, by a customer, to address any alarms and/or maintenance events. For example, a ticket may request that the network provider investigate an alarm generated by a circuit.

BRIEF DESCRIPTION OF THE DRAWINGS

FIG. 8 is a diagram depicting exemplary functions capable of being performed by the dashboard web server of FIG. 1;

FIG. 9 depicts a flow chart of an exemplary process for providing a dashboard interface group identifier according to implementations described herein; and FIG. 10 depicts a flow chart of an exemplary process for providing a dashboard according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may include systems and methods that provide a dashboard page for presentation and/or mapping of a customer's inventory and any alarms, tickets, and/or maintenance events associated with the customer's inventory. For example, in one implementation, the systems and methods may provide a dashboard interface group identifier that groups and/or correlates one or more customer identifiers into a single customer identifier. The dashboard interface group identifier may associate one or more customer products (e.g., inventory, tickets, alarms, etc.) with the single customer identifier, and/or may validate the single customer identifier.

A "page," as the term is used herein, is to be broadly interpreted to include any machine-readable and machine-storable work product. A page may include, for example, an e-mail, a web site, a file, a combination of files, one or more files with embedded links to other files, a news group posting, any of the aforementioned, etc. In the context of the Internet, a common document is a web page. Documents often include textual information and may include embedded information (such as meta information, images, hyperlinks, etc.) and/or embedded instructions (such as Javascript, etc.).

Figure 1:
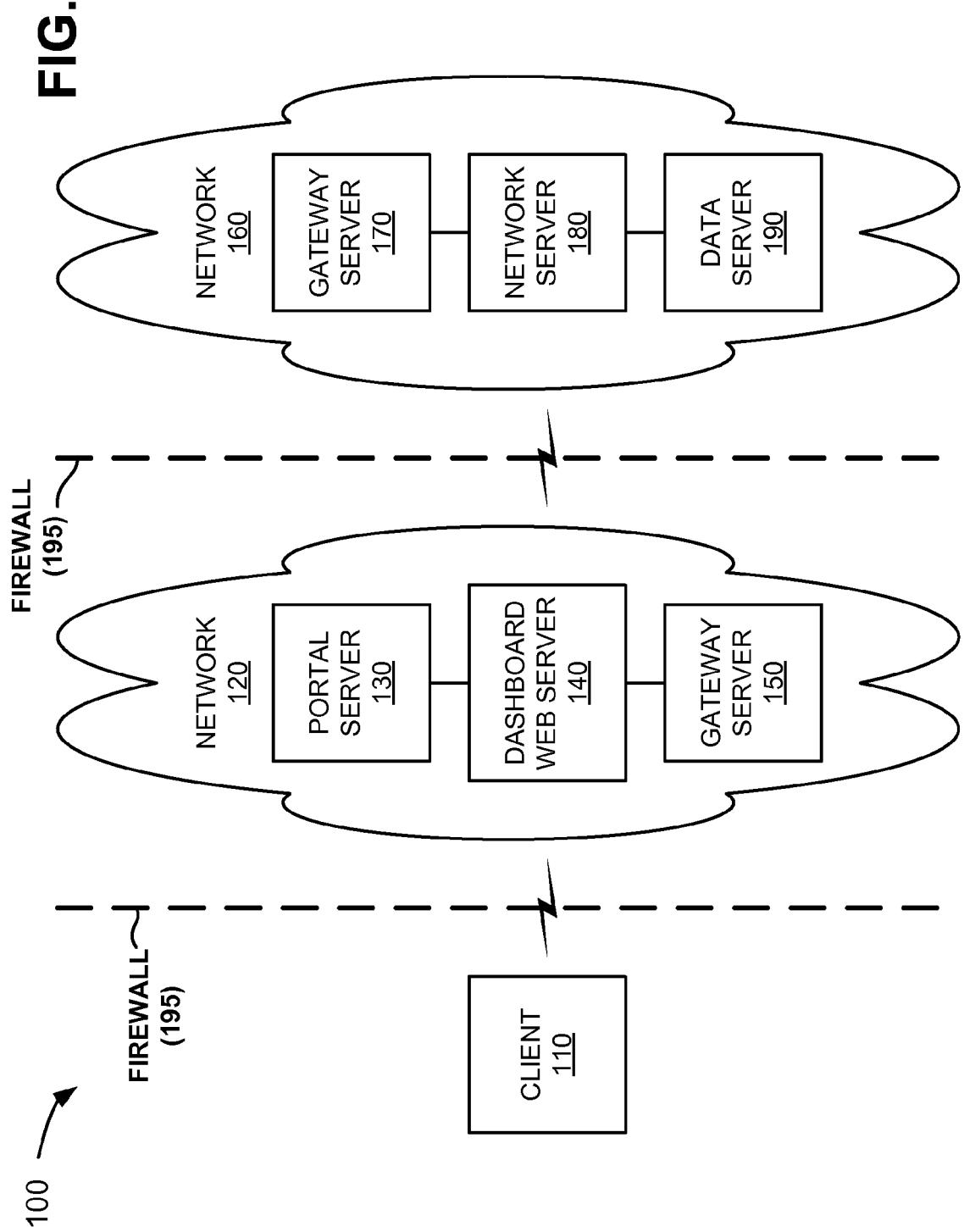
FIG. 1 is an exemplary diagram of a network in which systems and methods described herein may be implemented.

FIG. 1 is an exemplary diagram of a network 100 in which systems and methods described herein may be implemented. Network 100 may include a client 110, a network 120 that includes a portal server 130, a dashboard web server 140, and a gateway server 150, and a network 160 that includes a gateway server 170, a network server 180, and a data server 190. Portal server 130, dashboard web server 140, and gateway server 150 may be connected to one another via network 120. Gateway server 170, network server 180, and data server 190 may be connected to one another via network 160. One client, two networks, and six servers have been illustrated in FIG. 1 for simplicity. In practice, there may be more or less clients, networks, and/or servers. Also, in some instances, a client may perform one or more functions of a server, and a server may perform one or more functions of a client. Furthermore, in other instances, one of servers 130-150 and/or 170-190 may perform one or more functions of another one of servers 130-150 and/or 170-190. As further shown in FIG. 1, firewalls 195 may be provided between client 110 and network 120, and between network 120 and network 160.

Client 110 may include one or more entities. An entity may be defined as a device, such as a computer, a personal digital assistant (PDA), a laptop, or another type of computation or communication device, a thread or process running on one of these devices, and/or an object executable by one of these devices. In one implementation, client may enable a user to create, review, access, prioritize, etc. dashboard information (e.g., a user's inventory and any alarms, tickets, and/or maintenance events associated with the inventory) in a manner described herein.

Networks 120 and 160 each may include a Public Land Mobile Network (PLMN), a local area network (LAN), a wide area network (WAN), a metropolitan area network (MAN), a telephone network, such as the Public Switched Telephone Network (PSTN) or a cellular telephone network, an intranet, the Internet, or a combination of networks. In one implementation, networks 120 and 160 each may include a secure or private network, an intranet, a local network, applications and/or devices provided in a secure network, an intranet, or a local network, and/or any other network, device, application, and/or property that may require authorization and/or authentication. Client 110 may connect to network 120 via wired and/or wireless connections. Network 120 may connect to network 160 via wired and/or wireless connections.

Portal server 130 may include one or more server entities that gather, process, search, and/or provide information in a manner described herein. In one implementation, portal server 130 may provide a point of access to information which may be linked from various logically related applications. For example, portal server 130 may present information from diverse sources in a unified way, and may provide a way for enterprise systems to provide a consistent look and feel with access control and procedures for multiple applications.

In another example, portal server 130 may provide personalized capabilities to its visitors (e.g., users or customers), providing a pathway to other content.

Dashboard web server 140 may include one or more server entities that gather, process, search, and/or provide information in a manner described herein. In one implementation, dashboard web server 140 may provide a dashboard that presents and/or maps a customer's inventory (e.g., circuits, devices, etc. associated with a customer's network) and any alarms, tickets, and/or maintenance events associated with the customer's inventory. For example, dashboard web server 140 may provide a dashboard interface group identifier that groups and/or correlates one or more customer identifiers into a single customer identifier. The dashboard interface group identifier may associate one or more customer products (e.g., inventory, tickets, alarms, etc.) with the single customer identifier, and/or may validate the single customer identifier. Further details of dashboard web server 140 are provided below in connection with FIGS. 3 and 8.

Gateway servers 150 and 170 each may include one or more server entities that gather, process, search, and/or provide information in a manner described herein. In one implementation, gateway servers 150 and 170 each may serve as an entrance to networks 120 and 160, respectively. For example, in enterprise systems, gateway servers 150 and 170 each may route traffic from a device outside of networks 120 and 160, respectively, and may act as a proxy server and/or a firewall. In another example, gateway servers 150 and 170 each may be associated with a router (e.g., which may use headers and forwarding tables to determine where packets may be sent), and a switch (e.g., which may provide a path for the packet in and out of gateway servers 150 and 170).

Network server 180 may include one or more server entities that gather, process, search, and/or provide information in a manner described herein. For example, in one implementation, network server 180 may include one or more of a formula server, an analytics server, a web services management server, etc.

Data server 190 may include one or more server entities that gather, process, search, and/or provide information in a manner described herein. For example, in one implementation, data server 190 may store customer data repositories (e.g., associated with users of client 110), may store information associated with one or more customer products (e.g., inventory, tickets, alarms, etc.), and/or may store any other information capable of being provided by dashboard web server 140 to a customer (or user) via client 110.

Firewalls 195 may include any mechanisms that may regulate the types of traffic entering and/or exiting a public and/or private network (e.g., network 120 and/or network 160). In one implementation, firewalls 195 may be implemented by devices provided within networks 120 and 160, such as gateway servers 150 and 170. In other implementations, firewalls 195 may be implemented by devices other than gateway servers 150 and 170.

Although FIG. 1 shows exemplary components of network 100, in other implementations, network 100 may contain fewer, different, or additional components than depicted in FIG. 1.

Figure 2:
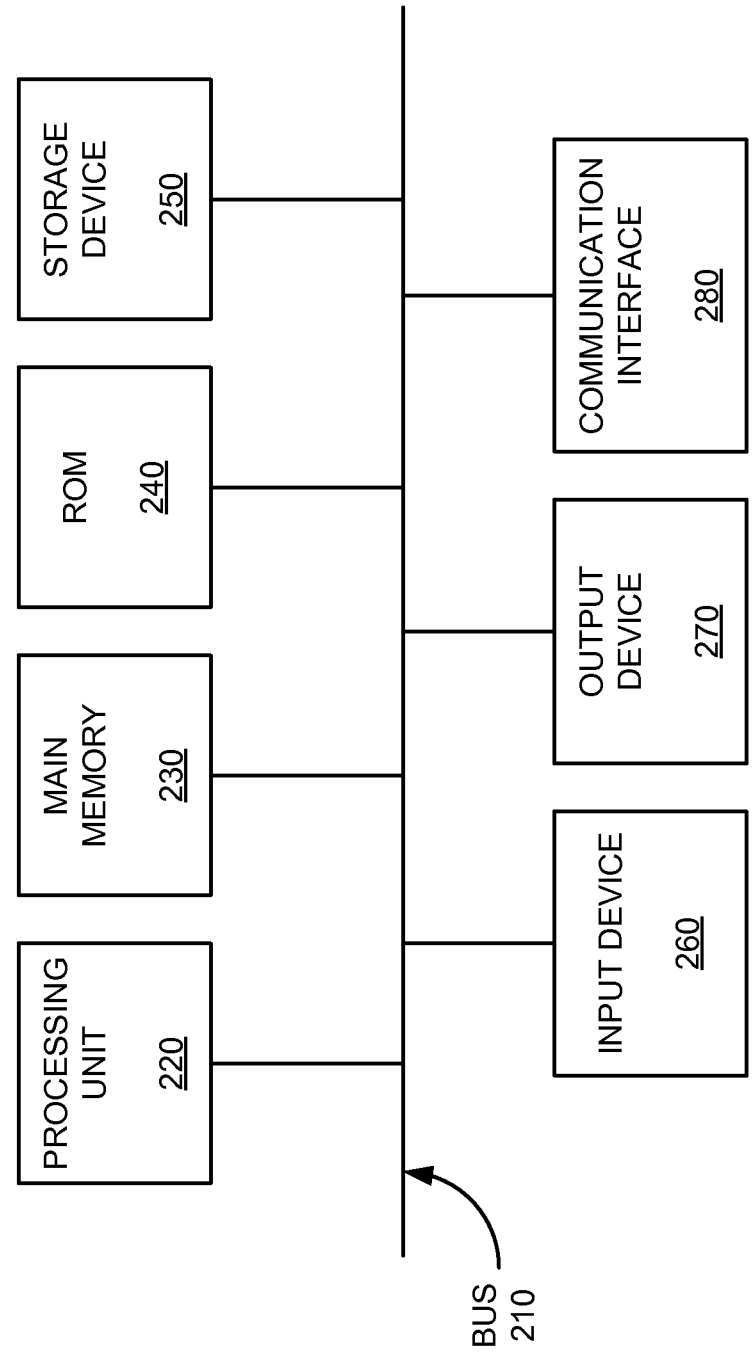
FIG. 2 is an exemplary diagram of a client and/or one or more servers of FIG. 1.

FIG. 2 is an exemplary diagram of a client/server entity corresponding to client 110 and/or servers 130-150 and 170-190. As illustrated, the client/server entity may include a bus 210, a processing unit 220, a main memory 230, a read-only memory (ROM) 240, a storage device 250, an input device 260, an output device 270, and/or a communication interface 280. Bus 210 may include a path that permits communication among the components of the client/server entity.

Processing unit 220 may include a processor, microprocessor, or other type of processing logic that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive.

Input device 260 may include a mechanism that permits an operator to input information to the client/server entity, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 140.

As will be described in detail below, the client/server entity may perform certain operations in response to processing unit 220 executing software instructions contained in a computer-readable medium, such as main memory 230. A computer-readable medium may be defined as a physical or logical memory device and/or carrier wave. The software instructions may be read into main memory 230 from another computer-readable medium, such as storage device 250, or from another device via communication interface 280. The software instructions contained in main memory 230 may cause processing unit 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of the client/server entity, in other implementations, the client/server entity may contain fewer, different, or additional components than depicted in FIG. 2. In still other implementations, one or more components of the client/server entity may perform one or more of the tasks performed by one or more other components of the client/server entity.

Figure 3:
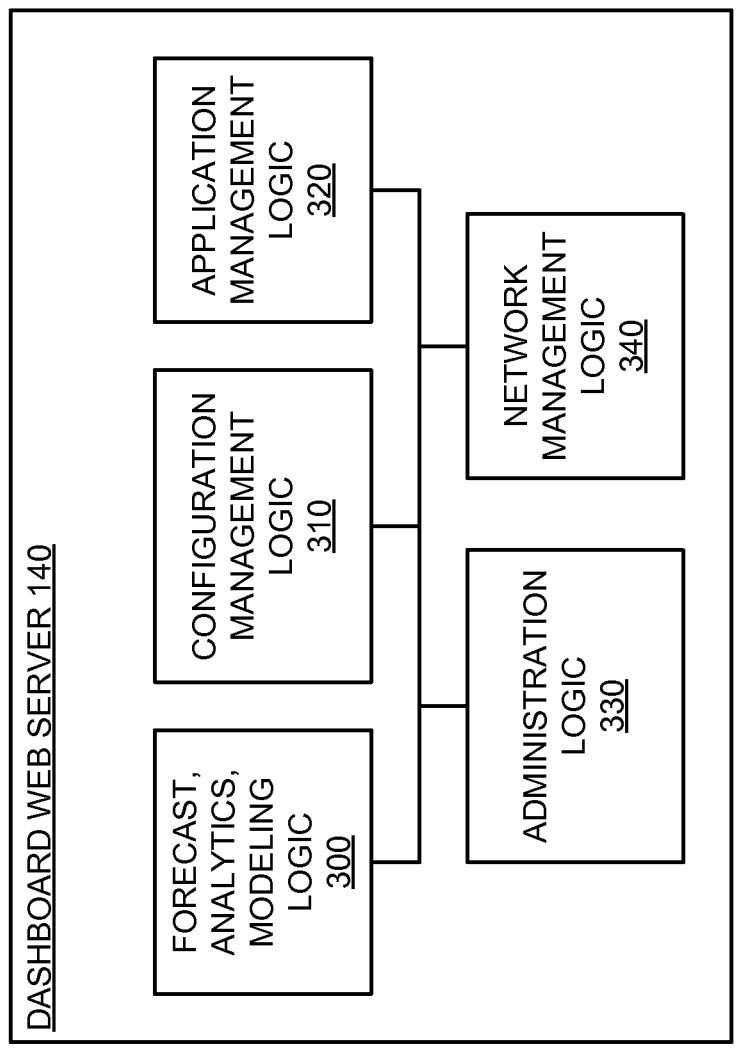
FIG. 3 is a diagram depicting exemplary functions capable of being performed by a dashboard web server of FIG. 1.

FIG. 3 is a diagram depicting exemplary functions capable of being performed by dashboard web server 140. As illustrated, dashboard web server 140 may include a variety of functional components, such as forecast, analytics, modeling logic 300, configuration management logic 310, application management logic 320, administration logic 330, and/or network management logic 340.

Forecast, analytics, modeling logic 300 may provide network modeling and/or capacity planning for a network associated with a customer (e.g., a user of client 110). For example, in one implementation, forecast, analytics, modeling logic 300 may permit a customer to perform network impact projections (e.g., on a network associated with the customer), expense planning (e.g., for the customer's network), and/or "what-if" scenarios (e.g., the customer may determine what would happen to the customer's network if an additional circuit was added).

Configuration management logic 310 may provide command and control capabilities of a network associated with a customer (e.g., a network provided by a dashboard generated by dashboard web server 140). In one implementation, configuration management logic 310 may permit a customer to manage a configuration of the customer's network. For example, configuration management logic 310 may permit the customer to create rules-based routing, and to request bandwidth on demand for the customer's network. In another example, configuration management logic 310 may permit the customer to test its network, and may provide the customer with network inventory and auto-discovery tools.

Application management logic 320 may provide business services management tools for a network associated with a customer. For example, in one implementation, application management logic 320 may permit the customer to perform general business outcome testing, business impact analysis, and/or true cost of service metrics for the customer's network. In another example, application management logic 320 may provide enterprise application interfaces (e.g., point-of-sale networks and kiosks), web hosting, and/or security management services for the customer's network.

Administration logic 330 may provide self service tools for a customer and a network associated with the customer. For example, in one implementation, administration logic 330 may provide service provisioning, a service catalog, account information, the customer's roles and entitlements, an account communicator, and/or online collaboration services for the customer's network.

Network management logic 340 may provide network operation services for a network associated with a customer. For example, in one implementation, network management logic 340 may provide fault and trouble management, network availability status, performance reporting, metric reporting, a network topology map, inventory and/or auto discovery services, security and/or threat identification services, and/or customer platform access services for the customer's network.

Although FIG. 3 shows exemplary functional components of dashboard web server 140, in other implementations, dashboard web server 140 may contain fewer, different, or additional functional components than depicted in FIG. 3. In still other implementations, one or more functional components of dashboard web server 140 may perform one or more of the tasks performed by one or more other functional components of dashboard web server 140.

Figure 4:
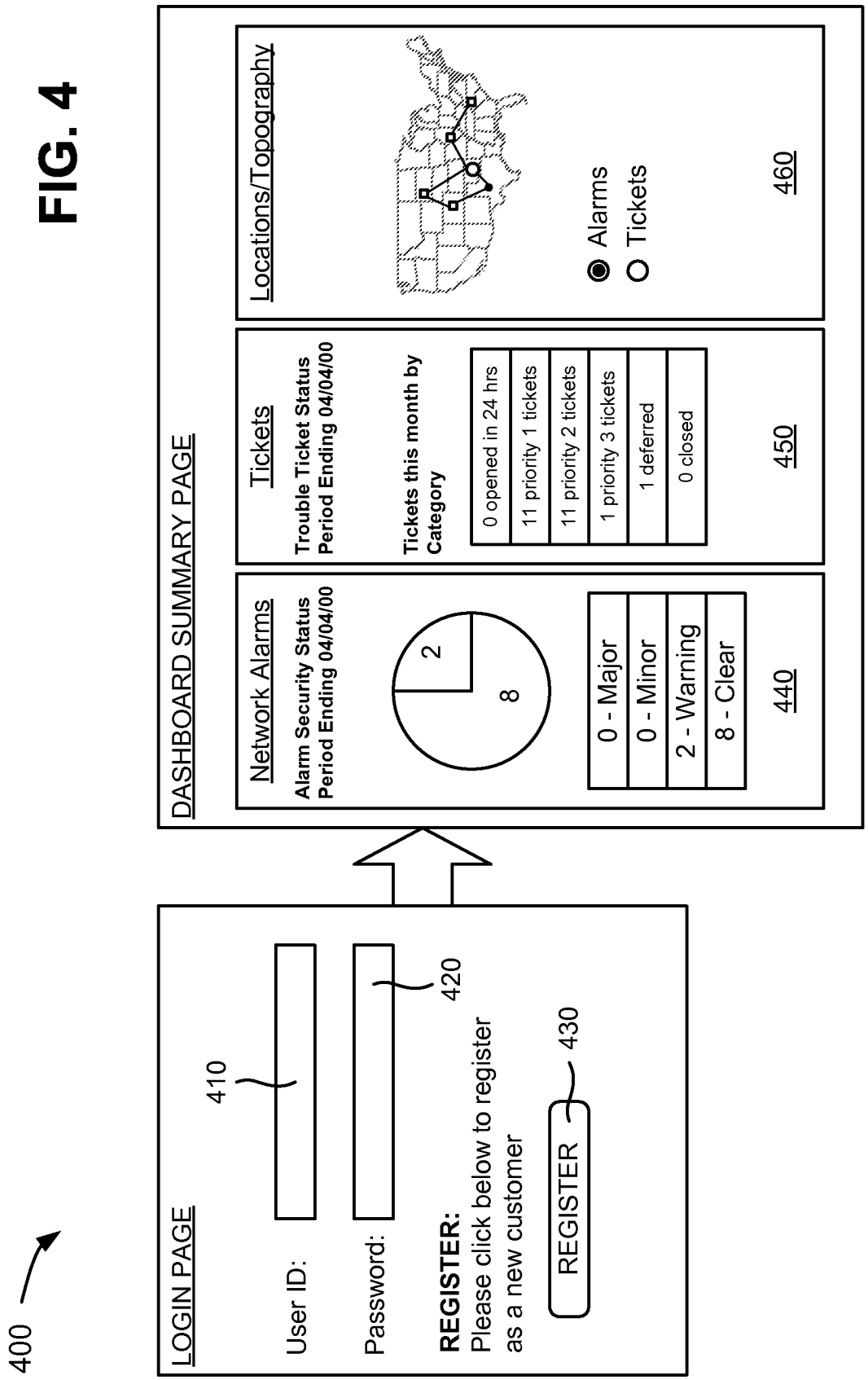
FIG. 4 is a diagram of an exemplary user interface that depicts a login page and a dashboard summary page, and may be provided by the dashboard web server of FIG. 1.

FIG. 4 is a diagram of an exemplary user interface 400 that depicts a login page and a dashboard summary page. In one implementation, user interface 400 may be provided by dashboard web server 140 to client 110. As illustrated, the login page of user interface 400 may depict a variety of mechanisms for a user (e.g., via client 110) to access information about a network, such as a user identification (ID) field 410, a password field 420, and/or a mechanism 430 to enable a new customer to register.

User ID field 410 may enable a customer to enter customer identification information (e.g., a numeric string, a string of letters, an alphanumeric string, etc.) that may identify the customer to dashboard web server 140. Password field 420 may enable the customer to enter a unique password (e.g., a numeric string, a string of letters, an alphanumeric string, etc.) that may ensure dashboard web server 140 that the customer identified in user ID field 410 is a valid customer. Dashboard web server 140 may compare the information entered in user ID field 410 and/or password field 420 to a database in order to provide secure access to the customer's network information.

Register mechanism 430 may include a button, an icon, a link, and/or other similar selection mechanisms. If a customer selects register mechanism 430, the customer may be permitted to register as a new customer with dashboard web server 140. For example, the customer may be presented with a user interface that enables the customer to enter registration information (e.g., a user ID, a password, one or more networks associated with the customer, customer billing information, a mailing address, etc.). If a customer registers with dashboard web server 140, the customer may be able to access the services provided by dashboard web server 140 via user ID field 410 and/or password field 420.

If a customer successfully logs into dashboard web server 140 (e.g., via input of correct information into user ID field 410 and password field 420), user interface 400 (e.g., via dashboard web server 140) may present the dashboard summary page shown in FIG. 4. As illustrated, the dashboard summary page of user interface 400 may provide a variety of information about one or more networks associated with a customer (e.g., a customer who accessed dashboard web server 140 via the login page). For example, the dashboard summary page may provide a network alarms section 440, a tickets section 450, and/or a locations/topography section 460.

Network alarms section 440 may display any alarm conditions occurring in the customer's network, and/or the severity of any alarm conditions. For example, as shown in FIG. 4, the customer's network may include "0" major network alarms, "0" minor network alarms, "2" warning network alarms, and/or "8" network alarms that have cleared alarm status (e.g., an alarm does not exist anymore).

Tickets section 450 may display any tickets related to a maintenance event and/or an alarm condition. A "ticket," as the term is used herein, is to be broadly construed to include a mechanism (e.g., a trouble ticket or trouble report) that may be used to track detection, reporting, and resolution of some type of problem (e.g., an outage in the customer's network). For example, a ticket may be created by a trouble ticketing system as specified by the Internet Engineering Task Force (IETF) in RFC 1297, ticketing software, etc. In another example, a ticket may define a problem and may help to coordinate with people who may work on the problem. In still another example, as a ticket moves though a system (e.g., via dashboard web server 140), it may be classified as a certain type of problem, which in turn may determine an expertise level of people assigned to address the ticket. If a problem is not resolved, an "open ticket" for the problem may remain in a work queue. If a problem is resolved, a ticket may be "closed."

Returning to FIG. 4, tickets section 450 may provide a status of a ticket, and/or may display a number of tickets in a time period (e.g., monthly, weekly, etc.) by category (e.g., priority, opened, closed, etc.). For example, as shown in FIG. 4, tickets section 450 may indicate that "0" tickets have been opened in the past twenty-four hours, "11" tickets are priority "1" tickets, "11" tickets are priority "2" tickets, "1" ticket is a priority "3" ticket, "1" ticket has been deferred, and "0" tickets have been closed.

Locations/topography section 460 may provide a visual display (e.g., a map) of locations of inventory items of the customer's network, and/or any alarms and/or tickets associated with the customer's inventory items. For example, as shown in FIG. 4, an alarm may exist for an inventory item (e.g., a circuit, a node, a device, etc.) located in Texas, and a ticket may exist for an inventory item located in Oklahoma.

The dashboard login and summary pages depicted in FIG. 4 and other dashboard-related pages (e.g., FIGS. 5-7) may collect and display a customer's inventory (e.g., circuits, devices, etc. of a network associated with the customer), and/or any alarms, tickets, and/or maintenance events associated with the customer's inventory. In one implementation, the dashboard-related pages may display a map providing locations of the customer's inventory, and/or any alarms, tickets, and/or maintenance events occurring at such locations. A user of the dashboard-related pages may zoom in on any one of the locations and may view specific details of a site, equipment, circuits, etc. at the location, and/or any alarms, tickets, maintenance events, etc. associated with the location. The map may include symbols (e.g., icons) with unique shapes and/or color coding which may correspond to inventory items, alarms, tickets, maintenance events, etc. In other implementations, the dashboard-related pages may display the customer's inventory, and/or any alarms, tickets, and/or maintenance events associated with the customer's inventory in one or more pop-up windows, in a tabular format in one or more windows, in a spreadsheet-like format in one or more windows, etc. In other implementations, the dashboard-related pages may provide a customer-specific, consolidated near real-time view of operational data (e.g., network performance, trouble management, etc.), and/or may provide customizable views and access for customers to services and performance information.

In one exemplary implementation, dashboard web server 140 may consolidate such information (e.g., inventory, alarms, tickets, maintenance events, etc.), and may correlate the information via an interface group identifier (e.g., for inventory and/or tickets), as described herein, and/or via circuit or device identifications (e.g., for alarms and/or maintenance events). In another exemplary implementation, dashboard web server 140 may include the features set forth in co-pending application Ser. No. 11/771,365, entitled "DASHBOARD MAINTENANCE/OUTAGE CORRELATION," filed on the same date herewith, the disclosure of which is incorporated by reference herein in its entirety. In still another exemplary implementation, dashboard web server 140 may include the features set forth in co-pending application Ser. No. 11/771,337, entitled "DASHBOARD MAP FILTERING AND CLUTTER/DECLUTTER ALGORITHMS," filed on the same date herewith, the disclosure of which is incorporated by reference herein in its entirety.

Dashboard web server 140 may include a network availability algorithm that may be based upon ticket outage time data (e.g., provided in data server 190). For example, dashboard web server 140 may correlate customer information to network inventory used for service to the customer associated with the customer information. Based upon the inventory assigned to the customer, dashboard web server 140 may collect an outage time per item of inventory (e.g., per circuit). This information may be stored in data server 190 and may include a link to an inventory system which dashboard web server 140 may also use. The outage time may be calculated to exclude any outage time associated with the customer so that a true outage time calculation, at any given time, may be provided that may be based on down time of the inventory (e.g., circuit, device, etc.) due the customer's network issues. Dashboard web server 140 may use the outage time to provide an indication of the customer's network performance. For example, dashboard web server 140 may display (e.g., via client 110) visual indicators via color coded status bars, degraded duration times, and/or critical duration calculations based on customer-provided ranges. In another example, dashboard web server 140 may permit the customer to review individual components of an outage duration that may be sorted based on circuit product type. In still another example, dashboard web server 140 may correlate and/or present customer data-to-circuit-to-network availability information.

Although FIG. 4 shows exemplary elements of user interface 400, in other implementations, user interface 400 may contain fewer, different, or additional elements than depicted in FIG. 4.

Figure 5:
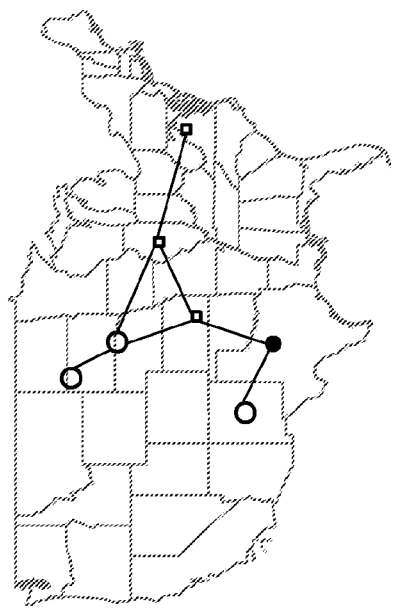
FIG. 5 is a diagram of an exemplary user interface that depicts a dashboard console page, and may be provided by the dashboard web server of FIG. 1.

FIG. 5 is a diagram of an exemplary user interface 500 that depicts a dashboard console page. In one implementation, user interface 500 may be provided by dashboard web server 140 to client 110. As illustrated, the dashboard console page of user interface 500 may depict a variety of information about one or more networks associated with a customer (e.g., a customer who accessed dashboard web server 140 via client 110). For example, the dashboard console page may provide a network availability section 510, an alarms/ticketing section 520, a locations/topography section 530, a tickets performance breakout section 540, a network alarms section 550, and/or a tickets section 560.

Network availability section 510 may provide a list of one or more networks associated with a customer. For example, as shown in FIG. 5, network availability section 510 may depict a dedicated long distance network, a private IP network, a private line network in the United States (U.S.), and an unassigned network that may be associated with a customer. Network availability section 510 may provide information about each network listed therein. For example, as shown in FIG. 5, a current status, a degraded duration (e.g., in hours and minutes over the last twenty-four hours), and/or a critical duration (e.g., in hours and minutes over the last twenty-four hours) for each network depicted in network availability section 510 may be provided.

Alarms/ticketing section 520 may provide a list of information associated with any alarms and/or tickets associated with any inventory of the customer's network(s). For example, as shown in FIG. 5, alarms/ticketing section 520 may depict an alarm date/time category, an alarm identification (ID) category, an alarm severity category, a ticket identification (ID) category, a ticket date/time category, and/or a ticket priority category. In other implementations, alarms/ticketing section 520 may include other categories, such as a network device identification category, a circuit identification category, a service type category, a location category, a description category, etc.

Alarm and/or ticketing information may be associated with each of these categories. For example, the alarm date/time category may include a date and time of "May 7, 2007, 11:10 AM," the alarm ID category may include an ID of "16578548," the alarm severity category may include a severity of "clear," the ticket ID category may include an ID of "20060410002991," the ticket date/time category may include a date and time of "May 7, 2007, 12:15 PM," and/or the ticket priority category may include a priority of "PRI 2." Such information may indicate that an alarm occurred in the customer's network (e.g., on a particular device and/or circuit of the network, and/or at a particular location in the network) on May 7, 2007 at 11:10 AM, that the alarm was identified by the number "16578548," and that the alarm had been cleared. Such information may further indicate that a ticket (with a level two priority) identified by the number "20060410002991" was issued on May 7, 2007 at 12:15 PM to address the alarm identified by the number "16578548."

Locations/topography section 530 may provide a visual display (e.g., a map) of locations of inventory items of the customer's network, and/or any alarms and/or tickets associated with the customer's inventory items. For example, as shown in FIG. 5, an alarm may exist for an inventory item (e.g., a circuit, a node, a device, etc.) located in Texas, and a ticket may exist for an inventory item located in New Mexico. In one implementation, a customer may select one of the locations of the inventory items provided by the map in locations/topography section 530, and dashboard web server 140 may display additional details about the selected location. For example, if the customer selected the location of the alarm in Texas, dashboard web server 140 may provide information such as the duration of the alarm, any tickets associated with the alarm, the device or devices associated with the alarm, etc.

Tickets performance breakout section 540 may provide a performance breakout for tickets issued for one or more networks associated with a customer. The performance breakout may be based on a ticket type (e.g., repeat tickets, chronic tickets, number of tickets, etc.). Tickets performance breakout section 540 may further provide a ticket performance breakout for different customers associated with dashboard web server 140 so that customers may see how the network provider (e.g., an owner of the networks and/or dashboard web server 140) are addressing tickets throughout the network provider's supported networks.

Network alarms section 550 may display any alarm conditions occurring in the customer's network, and/or the severity of any alarm conditions. For example, as shown in FIG. 5, the customer's network may include "0" major network alarms, "0" minor network alarms, "2" warning network alarms, and/or "8" network alarms that have cleared alarm status (e.g., an alarm does not exist anymore).

Tickets section 560 may display any tickets related to a maintenance event and/or an alarm condition. Tickets section 560 may provide a status of a ticket, and/or may display a number of tickets in a time period (e.g., monthly, weekly, etc.) by category (e.g., priority, opened, closed, etc.). For example, as shown in FIG. 5, tickets section 560 may indicate that "0" tickets have been opened in the past twenty-four hours, "11" tickets are priority "1" tickets, "11" tickets are priority "2" tickets, "1" ticket is a priority "3" ticket, "1" ticket has been deferred, and "0" tickets have been closed.

Although FIG. 5 shows exemplary elements of user interface 500, in other implementations, user interface 500 may contain fewer, different, or additional elements than depicted in FIG. 5.

Figure 6:
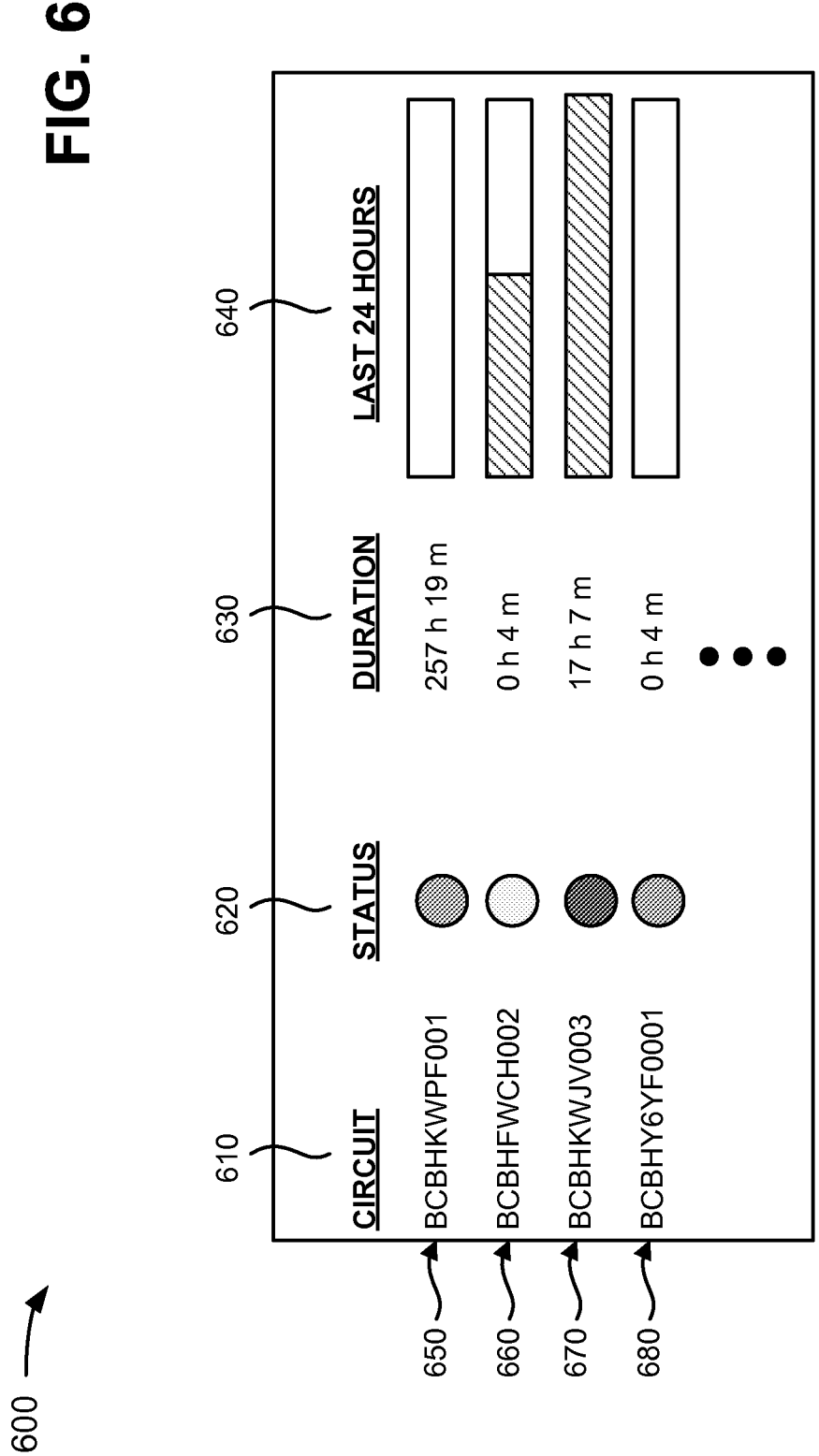
FIG. 6 is a diagram of an exemplary user interface that depicts an alarm and ticket menu, and may be provided by the dashboard web server of FIG. 1.

FIG. 6 is a diagram of an exemplary user interface 500 that depicts an alarm and ticket menu. In one implementation, user interface 600 may be provided by dashboard web server 140 to client 110. As illustrated, the alarm and ticket menu of user interface 600 may depict a variety of information about one or more networks associated with a customer (e.g., a customer who accessed dashboard web server 140 via client 110). For example, the alarm and ticket menu may provide a circuit category 610, a status category 620, a duration category 630, and/or an indicator 640 indicating a status for the last twenty-four hours. Each category may include one or more entries. As shown in FIG. 6, user interface 600 may display a first entry 650, a second entry 660, a third entry 670, and a fourth entry 680. Although user interface 600 depicts four entries, in other implementations, user interface 600 may display fewer, more, or different entries than depicted in FIG. 6. Furthermore, user interface 600 may display fewer, different, or additional categories than depicted in FIG. 6.

Circuit category 610 may provide a list of circuits (or other inventory items) of the customer's network. For example, first entry 650 may include a circuit ID number of "BCBHK-WPF001" under circuit category 610, second entry 660 may include a circuit ID of "BCBHFWCH002" under circuit category 610, third entry 670 may include a circuit ID of "BCB-HKWJV003" under circuit category 610, and fourth entry 680 may include a circuit ID of "BCBHY6YF0001" under circuit category 610.

Status category 620 may provide a visual indication (e.g., green for a functioning circuit, yellow for a circuit with a warning, and/or red for a circuit experiencing an alarm condition) of a status of a circuit provided in circuit category 610. For example, first entry 650 and fourth entry 680 may include a green status indicator under status category 620, second entry 660 may include a yellow status indicator under status category 620, and third entry 670 may include a red status indicator under status category 620.

Duration category 630 may provide the duration (e.g., in hours (h) and minutes (m)) of an alarm and/or a ticket associated with a circuit provided in circuit category 610. For example, first entry 650 may include a duration of "257 h 19 m" under duration category 630, second entry 660 may include a duration of "0 h 4 m" under duration category 630, third entry 670 may include a duration of "17 h 7 m" under duration category 630, and fourth entry 680 may include a duration of "0 h 4 m" under duration category 630.

Indicator 640 may provide a visual indication (e.g., a bar diagram) indicating a status of a circuit provided in circuit category 610 for the past twenty-four hours. For example, first entry 650 and fourth entry 680 may include an indication of circuit functionality under indicator category 640, second entry 660 may include an indication of partial circuit functionality under indicator category 640, and third entry 670 may include an indication of circuit failure under indicator category 640.

Although FIG. 6 shows exemplary elements of user interface 600, in other implementations, user interface 600 may contain fewer, different, or additional elements than depicted in FIG. 6.

Figure 7:
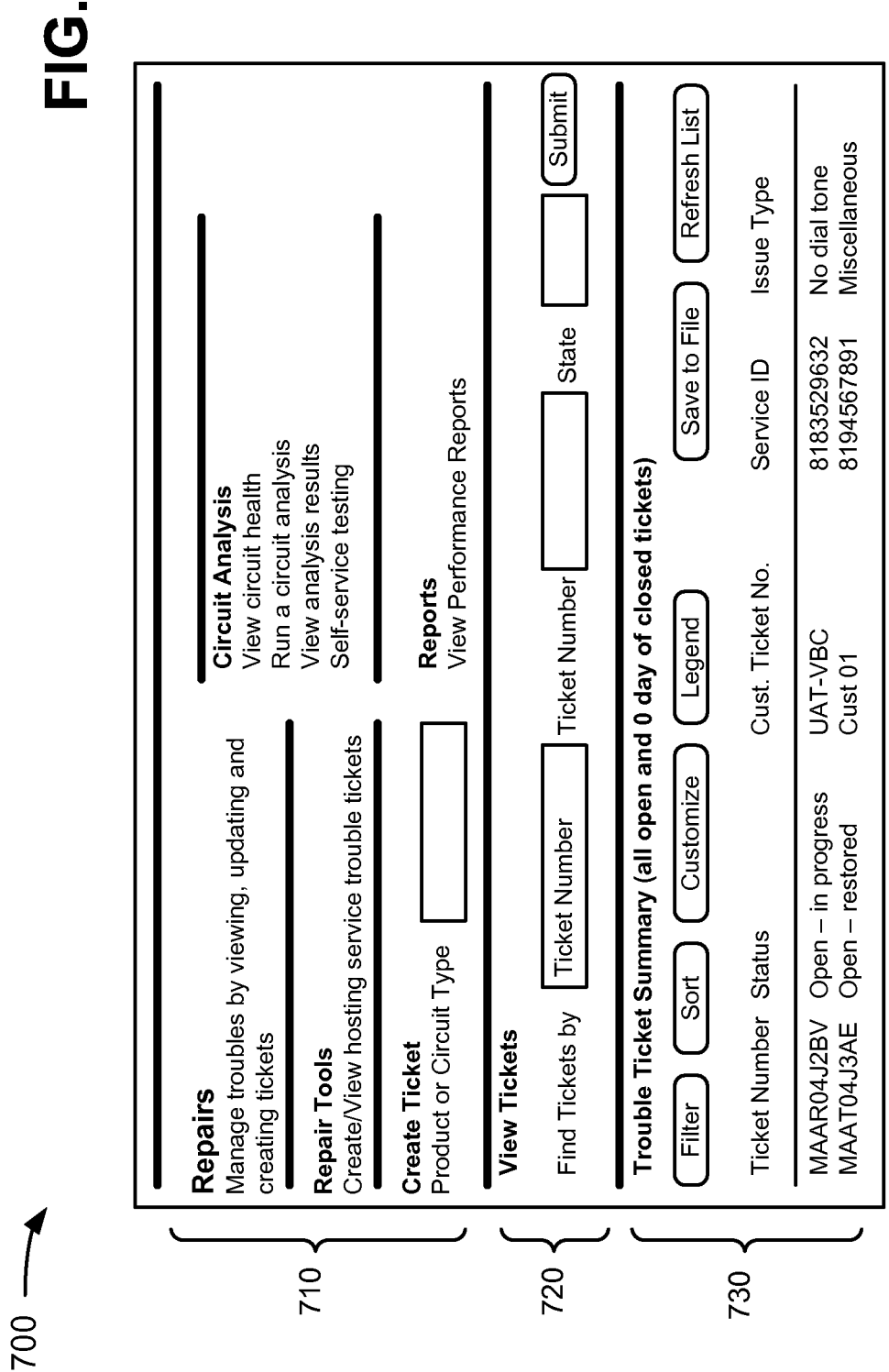
FIG. 7 is a diagram of an exemplary user interface that depicts a repairs and tickets menu, and may be provided by the dashboard web server of FIG. 1.

FIG. 7 is a diagram of an exemplary user interface 700 that depicts a repairs and tickets menu. In one implementation, user interface 700 may be provided by dashboard web server 140 to client 110. As illustrated, the repairs and tickets menu of user interface 700 may depict a variety of information about one or more networks associated with a customer (e.g., a customer who accessed dashboard web server 140 via client 110). For example, the repairs and tickets menu may provide a repairs section 710, a view tickets section 720, and/or a trouble ticket summary section 730.

Repairs section 710 may enable a customer to manage any problems associated with the customer's network. For example, repairs section 710 may include a repair tools portion that may permit the customer to create and view trouble tickets associated with the customer's network. Repairs section 710 may include a create ticket portion that may permit the customer to create a ticket for one or more products or circuits of the customer's network. A circuit analysis portion of repairs section 710 may permit the customer to perform a variety of tasks, such as view circuit health, run a circuit analysis, view circuit analysis results, perform self-service testing, etc. A reports portion of repairs section 710 may permit the customer to view performance reports associated with the customer's network(s).

View tickets section 720 may enable a customer to search for a specific ticket so that the customer may view additional information associated with the specific ticket. For example, the customer may find a ticket based on a ticket number by providing the ticket number and by selecting a submit mechanism. The customer may be provided with additional information associated with the specified ticket number. Alternatively and/or additionally, the customer may find one or more tickets based on location information (e.g., a state where an event addressed by the ticket is occurring) by providing the location information and by selecting the submit mechanism. The customer may be provided with a list of tickets from the specified location, and may select one or more of the listed tickets to see additional ticket information.

Trouble ticket summary section 730 may enable a customer to manage a list of open tickets associated with the customer's network. For example, trouble ticket summary section 730 may provide a list of open tickets, and may display information associated with the open tickets. Such associated information may include a ticket number (e.g., "MAAR04J2BV"), a status (e.g., "Open—in progress"), a customer ticket number (e.g., "UAT-VBC"), a service identification (ID) (e.g., "8183529632"), an issue type (e.g., "No dial tone"), a product type (e.g., "private IP"), a creation date (e.g., "May 17, 2006 at 11:01 AM"), etc. Trouble ticket summary section 730 may provide mechanisms that enable the customer to manage the list of open tickets, such as a filter mechanism (e.g., to enable the customer to filter the list based on a criteria), a sort mechanism (e.g., to enable the customer to sort the list based on a criteria), a customize mechanism (e.g., to enable the customer to customize the list), a legend mechanism (e.g., to enable the customer to adjust the legend of the list), a save-to-file mechanism (e.g., to enable the customer to save the list), and/or a refresh mechanism (e.g., to enable the customer to refresh the list).

Although FIG. 7 shows exemplary elements of user interface 700, in other implementations, user interface 700 may contain fewer, different, or additional elements than depicted in FIG. 7.

FIG. 8 is a diagram depicting exemplary functions capable of being performed by a dashboard web server 140. As illustrated, dashboard web server 140 may include a variety of functional components, such as customer identifier grouping logic 800 and/or validation logic 810.

Customer identifier grouping logic 800 may receive customer identifiers 820 and/or customer products 830, and may identify a customer associated with customer identifiers 820 and/or customer products 830 that dashboard web server 140 may support. Customer identifier grouping logic 800 may group and/or correlate one or more customer identifiers 820 into a single, flexible customer identifier 840 that may permit dashboard web server 140 to identify a customer. Customer identifier grouping logic 800 may associate single customer identifier 840 with customer products 830, and may provide single customer identifier 840 and the associated customer products 830 to validation logic 810.

Validation logic 810 may receive single customer identifier 840 and associated customer products 830, and may validate that the customer associated with single customer identifier 840 is entitled to request information and/or perform an operation on associated customer products 830. Such validation may ensure that customers are associated with their correct customer products 830, and may provide a security check for customer information. Validation logic 810 may output a single validated customer identifier (ID) 850 based on the validation, and may output the associated customer products 830.

Customer identifiers 820 may include any mechanism used to identify a customer. For example, in one implementation, dashboard web server 140 may incorporate systems that include different customer identifiers (e.g., corporate identifications (IDs), billing account numbers, Network Application Service Provider (NASP) IDs, subNASP IDs, Domain Name System (DNS) short names, etc.). In other implementations, custom identifiers 820 may include other mechanisms used to identify customers (e.g., stock symbols, tax identifications, etc.).

Customer products 830 may include information related to any inventory (e.g., any circuit, device, node, etc.), any service (e.g., toll free phone numbers, digital subscriber line (DSL) services, etc.), etc. associated with a customer's one or more networks. In one example, customer identifier grouping logic 800 may identify a customer (e.g., Customer ABC) via a NASP ID and three subNASP IDs for Customer ABC's circuit products, and may identify Customer ABC via three DNS short names for Customer ABC's managed devices. Customer identifier grouping logic 800 may group these eight customer identifiers into a single customer identifier for Customer ABC. Each piece of inventory (e.g., the circuit products and the managed devices) that includes one of these customer identifiers may also be identified by customer identifier grouping logic 800 for Customer ABC.

In one implementation, dashboard web server 140 may use single validated customer identifier 850 and the associated customer products 830 to provide any services described above as being provided by dashboard web server 140. For example, dashboard web server 140 may use single validated customer identifier 850 and the associated customer products 830 to provide any of the user interfaces described above in connection with FIGS. 4-7. If a customer logs into dashboard web server 140 (e.g., via the login page of user interface 400), dashboard web server 140 may associate the customer with the customer's single validated customer identifier 850, and may display the associated customer products 830 (e.g., circuits, devices, alarms, maintenance events) to the customer via user interfaces 400-700, as described above in connection with FIGS. 4-7.

Although FIG. 8 shows exemplary functional components of dashboard web server 140, in other implementations, dashboard web server 140 may contain fewer, different, or additional functional components than depicted in FIG. 8. In still other implementations, one or more functional components of dashboard web server 140 may perform one or more of the tasks performed by one or more other functional components of dashboard web server 140.

FIG. 9 depicts a flow chart of an exemplary process 900 for providing a dashboard interface group identifier according to implementations described herein. In one implementation, process 900 may be performed by dashboard web server 140. As illustrated, process 900 may begin with receipt of one or more customer identifiers associated with a customer (block 910), and receipt of one or more customer products associated with the customer (block 920). For example, in one implementation described above in connection with FIG. 8, customer identifier grouping logic 800 of dashboard web server 140 may receive customer identifiers 820 and/or customer products 830, and may identify a customer associated with customer identifiers 820 and/or customer products 830 that dashboard web server 140 may support.

As further shown in FIG. 9, the one or more customer identifiers may be grouped and/or correlated into a single customer identifier (block 930), and the single customer identifier may be associated with one or more customer products (block 940). For example, in one implementation described above in connection with FIG. 8, customer identifier grouping logic 800 may group and/or correlate one or more customer identifiers 820 into a single, flexible customer identifier 840 that may permit dashboard web server 140 to identify a customer. Customer identifier grouping logic 800 may associate single customer identifier 840 with customer products 830, and may provide single customer identifier 840 and the associated customer products 830 to validation logic 810 of dashboard web server 140.

As also shown in FIG. 9, the single customer identifier may be validated (block 950). For example, in one implementation described above in connection with FIG. 8, validation logic 810 may receive single customer identifier 840 and associated customer products 830, and may validate that the customer associated with single customer identifier 840 is entitled to request information and/or perform an operation on associated customer products 830. This may ensure that customers are associated with their correct customer products 830, and may provide a security check for customer information.

FIG. 10 depicts a flow chart of an exemplary process 1000 for providing a dashboard according to implementations described herein. In one implementation, process 1000 may be performed by dashboard web server 140. As illustrated, process 1000 may begin with receipt of a request for accessing one or more customer products from a customer (block 1010). For example, in one implementation described above in connection with FIG. 4, a customer may request access to one or more customer products by accessing dashboard-related pages via the login page of user interface 400. If a customer successfully logs into dashboard web server 140 (e.g., via input of correct information into user ID field 410 and password field 420 of the login page), user interface 400 (e.g., via dashboard web server 140) may present the dashboard summary page shown in FIG. 4.

As further shown in FIG. 10, inventory, alarms, tickets, maintenance events, etc. associated with the customer may be generated (block 1020), and a map displaying locations of the inventory, alarms, tickets, maintenance events, etc. may be generated (block 1030). For example, in one implementation described above in connection with FIG. 4, dashboard web server 140 may display the dashboard summary page of user interface 400. The dashboard summary page may display information related to network alarms (e.g., network alarms section 440), tickets (e.g., tickets section 450), locations/topography of inventory (e.g., locations/topography section 460), etc. that may be associated with the customer who logged in via the login page of user interface 400. In another implementation described above in connection with FIG. 5, dashboard web server 140 may display the dashboard console page of user interface 500. The dashboard console page may provide a network availability section 510, an alarms/ticketing section 520, a locations/topography section 530, a tickets performance breakout section 540, a network alarms section 550, and/or a tickets section 560. Locations/topography section 530 may provide a visual display (e.g., a map) of locations of inventory items of the customer's network, and/or any alarms and/or tickets associated with the customer's inventory items.

Returning to FIG. 10, a selection of a location on the map may be received (block 1040), and details associated with the selected location may be generated (block 1050). For example, in one implementation described above in connection with FIG. 5, a customer may select one of the locations of the inventory items provided by the map in locations/topography section 530, and dashboard web server 140 may display additional details about the selected location. For example, if the customer selected the location of the alarm in Texas, dashboard web server 140 may provide information such as the duration of the alarm, any tickets associated with the alarm, the device or devices associated with the alarm, etc.

Implementations described herein may include systems and methods that provide a dashboard for presentation and/or mapping of a customer's inventory and any alarms, tickets, and/or maintenance events associated with the customer's inventory. For example, in one implementation, the systems and methods may provide a dashboard interface group identifier that groups and/or correlates one or more customer identifiers into a single customer identifier. The dashboard interface group identifier may validate the single customer identifier, and/or may associate one or more customer products (e.g., inventory, tickets, alarms, etc.) with the single customer identifier.

The foregoing description of implementations provides illustration and description, but is not intended to be exhaustive or to limit the invention to the precise form disclosed. Modifications and variations are possible in light of the above teachings or may be acquired from practice of the invention.

For example, while a series of acts has been described with regard to FIGS. 9 and 10, the order of the acts may be modified in other implementations. Further, non-dependent acts may be performed in parallel.

Also, the terms "user" and "customer" have been used herein. The terms "user" and "customer" are intended to be broadly interpreted to include a client (e.g., client 110) or a user or customer of a client.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    receiving, by a computing device, a plurality of identifiers associated with a customer of a network,
        each of the plurality of identifiers identifying the customer;
    receiving, by the computing device, information identifying a plurality of products associated with the customer, the information identifying the plurality of products being provided by the network;
    grouping, by the computing device, the plurality of identifiers into a single customer identifier;
    associating, by the computing device, the single customer identifier with the information identifying the plurality of products;
    validating, by the computing device and based on associating the single customer identifier with the information identifying the plurality of products, the single customer identifier to produce a single validated customer identifier;
    receiving, by the computing device, a request from the customer to access the computing device,
        the request to access the computing device being unassociated with validating the single customer identifier;
    providing, by the computing device and based on the request, access to the computing device;

receiving, by the computing device and from the customer, a request for accessing the information identifying the plurality of products;

generating, by the computing device and based on receiving the request for accessing the information identifying the plurality of products, information regarding customer inventory, information regarding one or more tickets, and information regarding one or more maintenance events associated with one or more of the plurality of products; and generating, by the computing device, a map for displaying information identifying one or more locations associated with the information regarding the customer inventory, one or more locations associated with the information regarding the one or more tickets, and one or more locations associated with the information regarding the one or more maintenance events.

2. The method of claim 1, where validating the single customer identifier comprises:

providing a security check for customer information associated with the customer.

3. The method of claim 1, where receiving the plurality of identifiers comprises:

receiving, as the plurality of identifiers, at least one of a corporate identification, a billing account number, a Network Application Service Provider (NASP) identification, a subNASP identification, a Domain Name System (DNS) short name, a stock symbol, or a tax identification associated with the customer.

4. The method of claim 1, where receiving information identifying a plurality of products comprises:

receiving information associated with the information identifying the plurality of products, where the information associated with the information identifying the plurality of products includes information associated with at least one of a circuit, a device, a node, or a service provided by the network for use by the customer.

5. The method of claim 1, where grouping the plurality of identifiers comprises:

correlating the plurality of identifiers into the single customer identifier.

6. The method of claim 1, where receiving the request for accessing the information identifying the plurality of products comprises:

receiving a customer identification and a customer password.

7. The method of claim 1, where generating, based on receiving the request for accessing the information identifying the plurality of products, comprises at least one of:

generating, based on the request for accessing the information identifying the plurality of products, information associated with at least one of a circuit, a device, or a service provided by the network;

generating, based on the request for accessing the information identifying the plurality of products, an alarm associated with at least one of the circuit, the device, or the service;

generating, based on the request for accessing the information identifying the plurality of products, a ticket, of the one or more tickets, to address a problem associated with at least one of the circuit, the device, or the service; or generating, based on the request for accessing the information identifying the plurality of products, a maintenance event, of the one or more maintenance events, to perform maintenance on at least one of the circuit, the device, or the service.

8. The method of claim 1, further comprising:

receiving a selection of information identifying a location on the map; and displaying details associated with the selected location.

9. The method of claim 1, where generating the map comprises:

providing, for display, symbols with unique shapes and color coding that correspond to at least one of the information regarding the customer inventory, the information regarding the one or more tickets, or the information regarding the one or more maintenance events.

10. A system comprising:

one or more devices to:

receive a plurality of identifiers associated with a customer of a network,
  each of the plurality of identifiers identifying the customer, receive information associated with a plurality of products that is associated with the customer, the information associated with the plurality of products being provided by the network, group the plurality of identifiers into a single customer identifier, associate the single customer identifier with the information associated with the plurality of products, validate, based on the association of the single customer identifier with the information associated with the plurality of products, the single customer identifier to produce a single validated customer identifier, receive a request from the customer to access the one or more devices,
  the request to access the one or more devices being unassociated with the validation of the single customer identifier, provide, based on the request, access to the one or more devices;

receive, from the customer, a request for accessing the information identifying the plurality of products;

generate, based on receiving the request for accessing the information identifying the plurality of products, information regarding customer inventory, information regarding one or more tickets, and information regarding one or more maintenance events associated with one or more of the plurality of products; and generate a map for displaying information identifying one or more locations associated with the information regarding the customer inventory, one or more locations associated with the information regarding the one or more tickets, and one or more locations associated with the information regarding the one or more maintenance events.

11. The system of claim 10, where the one or more devices are further to:

associate the customer with the information associated with the plurality of products; and provide a security check for customer information associated with the customer.

12. The system of claim 10, where the plurality of identifiers comprise at least one of a corporate identification, a billing account number, a Network Application Service Provider (NASP) identification, a subNASP identification, a Domain Name System (DNS) short name, a stock symbol, or a tax identification associated with the customer.

13. The system of claim 10, where the information associated with the plurality of products comprises information associated with at least one of a circuit, a device, a node, or a service provided by the network for use by the customer.

14. The system of claim 10, where the one or more devices are further to at least one of:
    generate, based on the request for accessing the information associated with the plurality of products, information associated with at least one of a circuit, a device, or a service provided by the network;
    generate, based on the request for accessing the information associated with the plurality of products, an alarm associated with at least one of the circuit, the device, or the service;
    generate, based on the request for accessing the information associated with the plurality of products, a ticket, of the one or more tickets, to address a problem associated with at least one of the circuit, the device, or the service; or
    generate, based on the request for accessing the information associated with the plurality of products, a maintenance event, of the one or more maintenance events, to perform maintenance on at least one of the circuit, the device, or the service.

15. The system of claim 10, where the customer inventory comprises at least one of a circuit, a device, or a service provided by the network.

16. The system of claim 10, where the map includes symbols with unique shapes and color coding that correspond to at least one of the information regarding the customer inventory, the information regarding the one or more tickets, or the information regarding the one or more maintenance events.

17. The system of claim 10, where the one or more devices are further to:
    provide, for display, a status of one or more devices associated with the network.

18. The system of claim 10, where the one or more devices are further to:
    provide, for display, a mechanism for creating, viewing, and managing one or more of the tickets for addressing problems within the network.

19. A non-transitory computer-readable medium storing instructions, the instructions comprising:
    one or more instructions which, when executed by at least one processor, cause the at least one processor to:
        receive a plurality of identifiers associated with a customer of a network,
            each of the plurality of identifiers identifying the customer;
        receive information associated with a plurality of products associated with the customer, the information associated with the plurality of products being provided by the network;
        group the plurality of identifiers into a single customer identifier;
        associate the single customer identifier with the information associated with the plurality of products;
        validate, based on the association of the single customer identifier with the information associated with the plurality of products, the single customer identifier to produce a single validated customer identifier;
        receive a request from the customer to access the computing device,
            the request to access the computing device being unassociated with the validation of the single customer identifier;
        provide, based on the request, access to the computing device;
        receive, from the customer, a request for accessing the information identifying the plurality of products;
        generate, based on receiving the request for accessing the information identifying the plurality of products, information regarding customer inventory, information regarding one or more tickets, and information regarding one or more maintenance events associated with one or more of the plurality of products; and
        generate a map for displaying information identifying one or more locations associated with the information regarding the customer inventory, one or more locations associated with the information regarding the one or more tickets, and one or more locations associated with the information regarding the one or more maintenance events.

20. The non-transitory computer-readable medium of claim 19, where the one or more instructions include:
    one or more instructions to associate the customer with the information associated with the plurality of products; and
    one or more instructions to provide a security check for customer information associated with the customer.

21. The non-transitory computer-readable medium of claim 19, where the plurality of identifiers comprise at least one of a corporate identification, a billing account number, a Network Application Service Provider (NASP) identification, a subNASP identification, a Domain Name System (DNS) short name, a stock symbol, or a tax identification associated with the customer.

22. The non-transitory computer-readable medium of claim 19, where the information associated with the plurality of products comprises information associated with at least one of a circuit, a device, a node, or a service provided by the network for use by the customer.

23. The non-transitory computer-readable medium of claim 19, where the map includes symbols with unique shapes and color coding that correspond to at least one of the information regarding the customer inventory, the information regarding the one or more tickets, or the information regarding the one or more maintenance events.

* * * * *